Oct. 6, 1964  E. HAHN  3,151,535
PHOTOGRAPHIC CAMERA
Filed Oct. 27, 1961
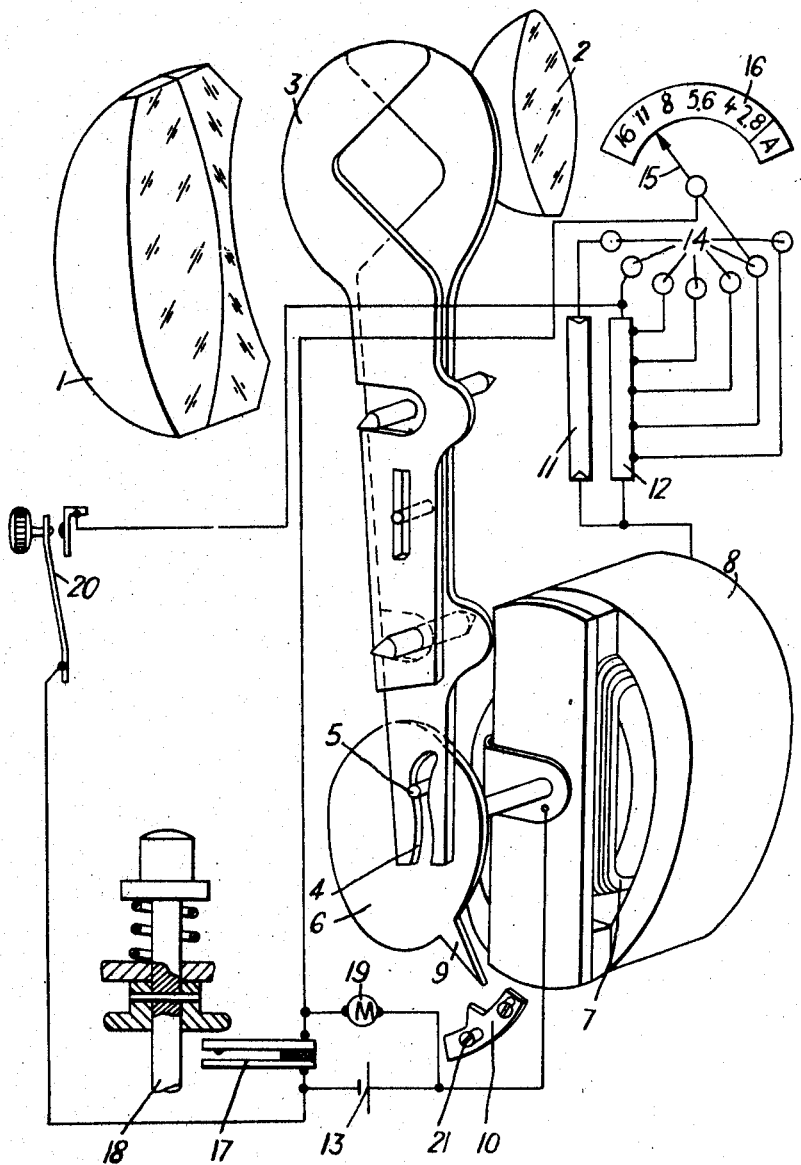
Inventor
ERICH HAHN
By Irwin J. Thompson
Attorney

3,151,535
PHOTOGRAPHIC CAMERA
Erich Hahn, Dresden, Germany, assignor to VEB Kamera- und Kinowerke Dresden, Dresden, Germany
Filed Oct. 27, 1961, Ser. No. 148,150
7 Claims. (Cl. 95—10)

The invention relates to a photographic camera with photo-electric exposure-measuring device, the moving coil of the galvanometer of which is coupled with the aperture diaphragm.

Known measuring devices of this kind possess separate current sources for the manual setting which may have to be effected of the automatically controllable setting member, to which sources the galvanometer may be connected according to choice after the disconnection of the photosensitive cell. Here a resistance disposed in series with the galvanometer and possessing a slider for the variation of its resistance value is arranged together with a changeover switch which additionally disconnects the photo-electric cell and connects the current source for the manual setting. In the same manner in each case separate switches are provided for the alternate switching in of a test resistance or of the photo-electric cell, which switches are coupled with one another through special gearings for the purpose of common actuation.

The aim of the invention is the avoidance of the plurality of switches and of the gearings provided for their common actuation by an improved arrangement, so that a measuring device is produced which is restricted to a minimum of structural parts.

In accordance with the invention this is achieved due to the fact that in parallel with a photo-electric resistance connected through the galvanometer to a battery there lies a fixed resistance possessing a plurality of tappings, and a selector switch is provided which alternately closes the photo-electric resistance and through the tappings the fixed resistance to the battery and the galvanometer. In order not to obtain a continuous current extraction through one of the connected resistances, in series with the selector switch there is disposed a switch preferably coupled with the camera release. This switch is here at the same time expediently disposed in the current circuit for the drive motor of the camera cocking and film winding mechanism. For the purpose of testing the battery voltage a further switch by-passing the measuring switch coupled with the camera release is connected to one of the tappings of the fixed resistance, while the moving coil of the galvanometer carries a pointer which swings in relation to a preferably adjustable check mark. The details of the invention may be seen from an illustrated and described example of embodiment.

In a camera housing (not specially shown) there is arranged between the lenses 1 and 2 of the objective the diaphragm 3, a slot 4 of which is engaged by a control pin 5. This control pin 5 is mounted on the control disc 6 which is connected with the moving coil 7 of a galvanometer 8. The control disc 6 further possesses a pointer 9 which swings in relation to a check mark 10. The check mark 10 is adjustable by means of the screws 21. The photo-electric resistance 11 and the fixed resistance 12 are connected parallel with one another to the battery 13.

The galvanometer 8 is connected in series with both resistances 11 and 12. The fixed resistance 12 is provided with a plurality of preferably adjustable tappings 14, which can be connected by means of a selector switch 15 by reference to a diaphragm scale 16 alternately to the galvanometer 8 and the battery 13. One of the marks of the diaphragm scale 16 is designated by "A," which signifies "automatic." Only in this position is the photo-electric resistance 11 connected into the measuring current circuit.

In the current circuit there lies a measuring switch 17 which is actuated by the camera release 18. This switch 17 at the same time interrupts the current circuit for a drive motor 19 for the camera cocking and film winding mechanism, which also is fed by the battery 13.

For the purpose of testing of the battery voltage, to be effected independently of the exposure operation, a control switch 20 by-passing the measuring switch 17 is provided, which is connected through one of the tappings 14 to the fixed resistance 12.

The manner of operation of the arrangement is as follows:

On depression of the camera release 18 the switch 17 is actuated and thus both the galvanometer current circuit and also the current circuit for the drive motor 19 are closed. When the selector switch 15 is in the position at "A" as a result of the prevailing brightness the resistance value of the photo-electric resistance 11 varies, so that a current corresponding to this brightness energises the galvanometer 8 and results in a deflection of the moving coil 7. The diaphragm 3 thus sets itself automatically to a value which ensures a correctly illuminated exposure.

For the manual setting of the diaphragm 3 the selector switch 15 is set to the desired diaphragm value. The photo-electric resistance 11 is here switched off and the fixed resistance 12 is connected in through one of the tappings 14. Then as soon as the camera release 18 is depressed, the measuring switch 17 closes the measuring current circuit, in which now a current corresponding to the pre-selected diaphragm value energises the galvanometer 8. The pre-selected diaphragm value is then set.

For the purpose of testing the voltage of the battery 13 the switch 20 is actuated. Thus independently of the opened measuring switch 17, through one of the tappings 14 the fixed resistance 12 is connected. Through the fixed resistance 12 there is produced a test resistance which causes a deflection of the moving coil 7. If the pointer 9 of the moving coil 7 reaches the check mark 10, the voltage of the battery 13 is still adequate for exact measurements.

I claim:

1. In a photographic camera having an objective lens mounted in the camera, and a variable aperture diaphragm arranged in the camera on the optical axis of the objective lens, the provision of an aperture setting device in the form of a moving coil and a photo-electric cell, means arranged between the aperture diaphragm and the moving coil for transmitting movement of the latter to the aperture diaphragm for the purpose of setting said diaphragm, a selector switch in the camera having a plurality of contacts, a first electrical circuit comprising a contact of the selector switch, a current source, the moving coil and the photo-electric cell connected in series in any desired order, and a second electrical circuit comprising the moving coil, the current source, the selector switch and a fixed resistance connected in series in any desired order, said fixed resistance having a series of tappings connected to a number of said contacts, wherein said selector switch optionally completes the first and second electrical circuits according to selection.

2. In a photographic camera having an objective lens mounted in the camera, and a variable aperture diaphragm arranged in the camera on the optical axis of the objective lens, the provision of an aperture setting device in the form of a moving coil and a photo-electric cell, means arranged between the aperture diaphragm and the moving coil for transmitting movement of the latter to the aperture diaphragm for the purpose of setting said diaphragm, a selector switch in the camera having a plurality of contacts, a first electrical circuit comprising a contact of the selector switch, a current source, a second switch, the moving coil and the photo-electric cell connected in series in any desired order, and a second electrical circuit comprising the moving coil, the current source, the selector switch, the second switch, and a fixed resistance connected in series in any desired order, said fixed resistance having a series of tappings connected to a number of said contacts, wherein said selector switch optionally selects the first and second electrical circuits as required, the actuation of said second switch completing the selected circuit.

3. In a photographic camera having an objective lens mounted in the camera, a variable aperture diaphragm arranged in the camera on the optical axis of the objective lens, and a shutter device having a release member therefore, the provision of an aperture setting device in the form of a moving coil and a photo-electric cell, means arranged between the aperture diaphragm and the moving coil for transmitting movement of the latter to the aperture diaphragm for the purpose of setting said diaphragm, a selector switch in the camera having a plurality of contacts, a first electrical circuit comprising a contact of the selector switch, a current source, a second switch operable by said release member, the moving coil and the photo-electric cell connected in series in any desired order, and a second electrical circuit comprising the moving coil, the current source, the selector switch, the second switch and a fixed resistance connected in series in any desired order, said fixed resistance having a series of tappings connected to a number of said contacts, wherein said selector switch optionally selects the first and second electrical circuits as required, the actuation of said second switch completing the selected circuit.

4. In a photographic camera having an objective lens mounted in the camera, a variable aperture diaphragm arranged in the camera on the optical axis of the objective lens, and a shutter device having a release member therefor, the provision of an aperture setting device in the form of a moving coil and a photo-electric cell, means arranged between the aperture diaphragm and the moving coil for transmitting movement of the latter to the aperture diaphragm for the purpose of setting said diaphragm, a selector switch in the camera having a plurality of contacts, a first electrical circuit comprising a contact of the selector switch, a current source, a second switch operable by said release member, the moving coil and the photo-electric cell connected in series in any desired order, a second electrical circuit comprising the moving coil, the current source, the selector switch, the second switch and a fixed resistance connected in series in any desired order, said fixed resistance having a series of tappings connected to a number of said contacts, and an electric drive motor operatively connected to said shutter device and electrically connected across said second switch and said current source, wherein said selector switch optionally selects the first and second electrical circuits as required, the actuation of said second switch completing the selected circuit and the motor circuit.

5. In a photographic camera having an objective lens mounted in the camera, and a variable aperture diaphragm arranged in the camera on the optical axis of the objective lens, the provision of an aperture setting device in the form of a moving coil and a photo-electric cell, means arranged between the aperture diaphragm and the moving coil for transmitting movement of the latter to the aperture diaphragm for the purpose of setting said diaphragm, a selector switch in the camera having a plurality of contacts, a first electrical circuit comprising a contact of the selector switch, a battery, the moving coil and the photo-electric cell connected in series in any desired order, a second electrical circuit comprising the moving coil, the battery, the selector switch and a fixed resistance connected in series in any desired order, said fixed resistance having a series of tappings connected to a number of said contacts, wherein said selector switch optionally completes the first and second electrical circuits according to selection, and a third electrical circuit comprising the moving coil, the fixed resistance, the battery and a further switch connected in series in any desired order, the completion of the third electrical circuit on closing said further switch causing the moving coil to move for the purpose of testing the battery.

6. In a photographic camera having an objective lens mounted in the camera, and a variable aperture diaphragm arranged in the camera on the optical axis of the objective lens, the provision of an aperture setting device in the form of a moving coil and a photo-electric cell, means arranged between the aperture diaphragm and the moving coil for transmitting movement of the latter to the aperture diaphragm for the purpose of setting said diaphragm, a pointer operatively connected to said transmission means for rotation thereby in relation to a mark on the camera, a selector switch in the camera having a plurality of contacts, a first electrical circuit comprising a contact of the selector switch, a battery, and the moving coil connected in series in any desired order, a second electrical circuit comprising the moving coil, the photo-electric cell, the battery, the selector switch and a fixed resistance connected in series in any desired order, said fixed resistance having a series of tappings connected to a number of said contacts, wherein said selector switch optionally completes the first and second electrical circuits according to selection, a third electrical circuit comprising the moving coil, the fixed resistance, the battery and a further switch connected in series in any desired order, the completion of the third electrical circuit on closing said further switch causing the pointer to move in relation to the fixed mark to indicate the condition of the battery.

7. A photographic camera as claimed in claim 6 wherein a plate carries the mark, and screws adjustably connect the plate to the camera through slots in the plate.

References Cited in the file of this patent

UNITED STATES PATENTS

| | | |
|---|---|---|
| 2,935,921 | Rentschler | May 10, 1960 |
| 2,973,699 | Nerwin | Mar. 7, 1961 |
| 2,999,446 | Hautmann | Sept. 12, 1961 |